United States Patent
Hey

(10) Patent No.: US 7,149,186 B1
(45) Date of Patent: Dec. 12, 2006

(54) APPARATUS AND METHOD FOR RATE ADAPTATION CONTROL

(75) Inventor: George Michael Hey, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 980 days.

(21) Appl. No.: 10/032,194

(22) Filed: Dec. 20, 2001

(51) Int. Cl.
*H04L 12/26* (2006.01)
*H04L 12/54* (2006.01)

(52) U.S. Cl. .................. 370/232; 370/412; 370/429
(58) Field of Classification Search ............ 370/458, 370/465, 468, 545
See application file for complete search history.

(56) References Cited

U.S. PATENT DOCUMENTS

| | | | | |
|---|---|---|---|---|
| 5,841,771 A | * | 11/1998 | Irwin et al. | 370/360 |
| 6,445,635 B1 | * | 9/2002 | Au et al. | 365/221 |
| 6,747,990 B1 | * | 6/2004 | Umayabashi et al. | 370/468 |
| 2002/0126689 A1 | * | 9/2002 | Redington | 370/442 |
| 2003/0048772 A1 | * | 3/2003 | Blum | 370/352 |
| 2004/0202169 A1 | * | 10/2004 | Mukouyama et al. | 370/395.1 |
| 2004/0213251 A1 | * | 10/2004 | Tran et al. | 370/395.1 |

OTHER PUBLICATIONS

Preliminary Data Sheet, Microelectronics Group, Lucent Technologies Bell Labs Innovations, "TTSI4K32T 4096-Channel, 32-Highway Time Slot Interchanger", Feb. 1999, 4 pages.
Xilinx Inc. Product Specification, Logicare Asynchronous FIFO V3.0, Nov. 3, 2000, pp. 1-12.

* cited by examiner

*Primary Examiner*—Brian Nguyen
(74) *Attorney, Agent, or Firm*—Marger Johnson & McCollom, P.C.

(57) ABSTRACT

A rate based FIFO controller identifies a time slot value for a number of time slots allocated for receiving or transmitting data in a frame and selects data fill level threshold values in a FIFO according to the time slot value. Data is then written into and read out of the FIFO according to a comparison of the data fill level in the FIFO with the threshold values.

50 Claims, 8 Drawing Sheets

TDM TO SERIAL

SERIAL TO TDM

| | RD_EN | WR_EN | SLIP |
|---|---|---|---|
| RESET | 0 | 0 | 0 |
| FILL | 0 | 1 | 1 |
| NORMAL | 1 | 1 | 0 |
| DEPLETE | 1 | 0 | 1 |

… shows a rate based First In-First Out (FIFO)
APPARATUS AND METHOD FOR RATE ADAPTATION CONTROL

BACKGROUND

A multi-service telecommunications system may provide customer services utilizing both synchronous serial bit streams and channelized Time Division Multiplexed (TDM) bit streams. A synchronous serial bit stream such as that utilizing the V.35 protocol transports bit oriented data. A channelized TDM bit stream such as a T1 or E1 bit stream may transport byte or bit oriented data in 125 microsecond (us) frames, using bandwidth allocations of 56 thousand (k) or 64k Bits Per Second (bps) "DS0s". The 56k and 64k bandwidth allocations depend on whether the Least Significant Bit (LSB) of the 8-bit DS0 time slot is preserved end-to-end. Selected DS0s may or may not be contiguous within the TDM frame.

The TDM data stream and synchronous serial data interfaces each transport clock information between endpoints. A synchronous serial interface includes separate and distinct clock connections used for synchronizing transmit and receive data. Clocking for the channelized TDM streams is embedded within the data stream and extracted on either receiving end using known recovery schemes.

Some TDM data streams, such as those provided by T1 services, provide 1<=N<=24 DS0 time slots for each frame. Other TDM data streams, such as those provided by E1 services, provide 1<=N<=32 DS0s for each frame. If the synchronous serial data rate is equal to the bandwidth used by a multiple (N) number of DS0s, bi-directional data can be cross connected between the serial data stream and the selected N DS0s within the TDM stream using First In-First Out (FIFO) buffers. Rate adaptation FIFOs are normally sized for the maximum memory depth necessary for buffering data bursts occurring within the frame period. For example, the minimum required FIFO depth, in bits is N=(32 DS0s/frame)*(8 bits/DS0)*2. Reading out from the FIFO is enabled when the incoming data to the FIFO has reached half this depth.

In these FIFO designs, when the number of time slots used per frame (N) is small, more incoming frames are required before the FIFO will reach the "fill" level required to enable data to be read out from the FIFO. This increases data latency. Many FIFOs only include a single "half full" indicator that does not permit much visibility into the actual FIFO fill level.

The present invention addresses this and other problems associated with the prior art.

SUMMARY OF THE INVENTION

A rate based FIFO controller identifies a time slot value for a number of DS0 time slots used within a TDM channel group for receiving or transmitting data in a frame and selects data fill level threshold values in a FIFO according to the time slot value. Control of data written into and read out of the FIFO is then provided according to a comparison of the data fill level in the FIFO with the threshold values.

The foregoing and other objects, features and advantages of the invention will become more readily apparent from the following detailed description of a preferred embodiment of the invention, which proceeds with reference to the accompanying drawings.

DETAILED DESCRIPTION

Figure 1:
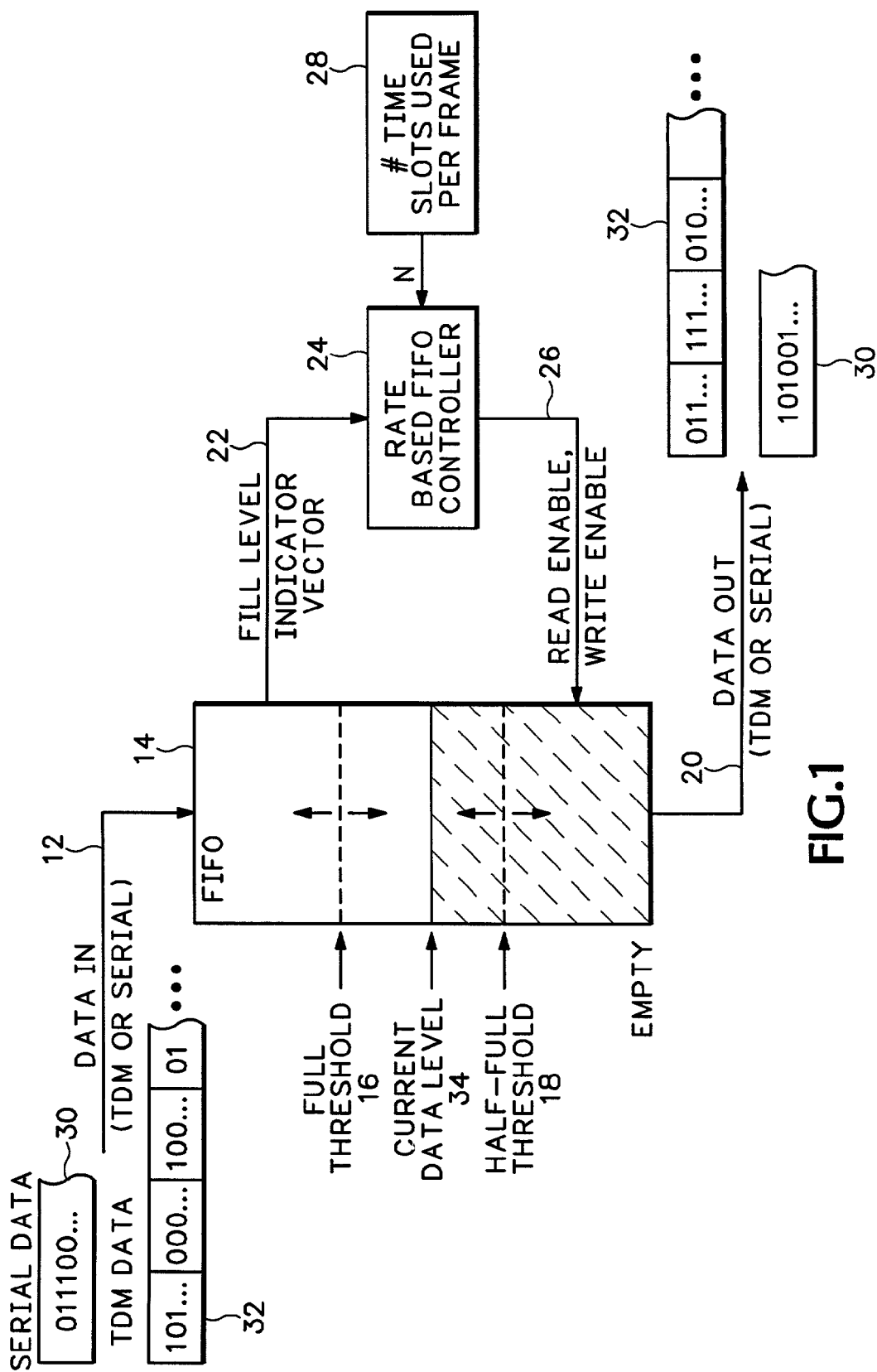
FIG. 1 is a block diagram showing a rate based FIFO controller.

FIG. 1 shows a rate based First In-First Out (FIFO) controller 24 that reduces latency by varying threshold depths 16 and 18 in a FIFO 14 according to the number of time slots (N) used for transferring data. Either TDM data 32 or bit oriented nonmultiplexed serial data 30 is written into the FIFO 14 at a FIFO input 12. Examples of TDM data 32 include T1 and E1 data streams. The TDM data 32 or serial data 30 is then output at a data output 20. In one example, serial data 30 is written into FIFO input 12 and TDM data 32 is read out at FIFO output 20. In another example, TDM data 32 is written into data input 12 and serial data 30 is read out from output 20. In other implementations, TDM data can be written into and read out of the FIFO 14 or serial data is written into and read out of the FIFO 14.

A level indicator vector signal 22 identifies how much data is currently being stored in FIFO 14. In one example, the level indicator vector signal 22 represents the difference between the read and write pointers that identify the last address read from the FIFO 14 and the last address written into the FIFO 14. A register 28, or some other storage device or control signal, identifies a number of time slots (N) that are used in a TDM frame for either writing data into or reading data from the FIFO 14.

Based on N, the controller 24 identifies a full level threshold 16 and a half-full level threshold 18 in the FIFO 14. Controller 24 monitors the level indicator 22 to determine a current data fill level 34. The controller 24 then generates read and write enables 26 according to the current data level 34 in relation to the thresholds 16, 18, and possibly other empty and full thresholds, identified by the level indicator 22.

Figure 2:
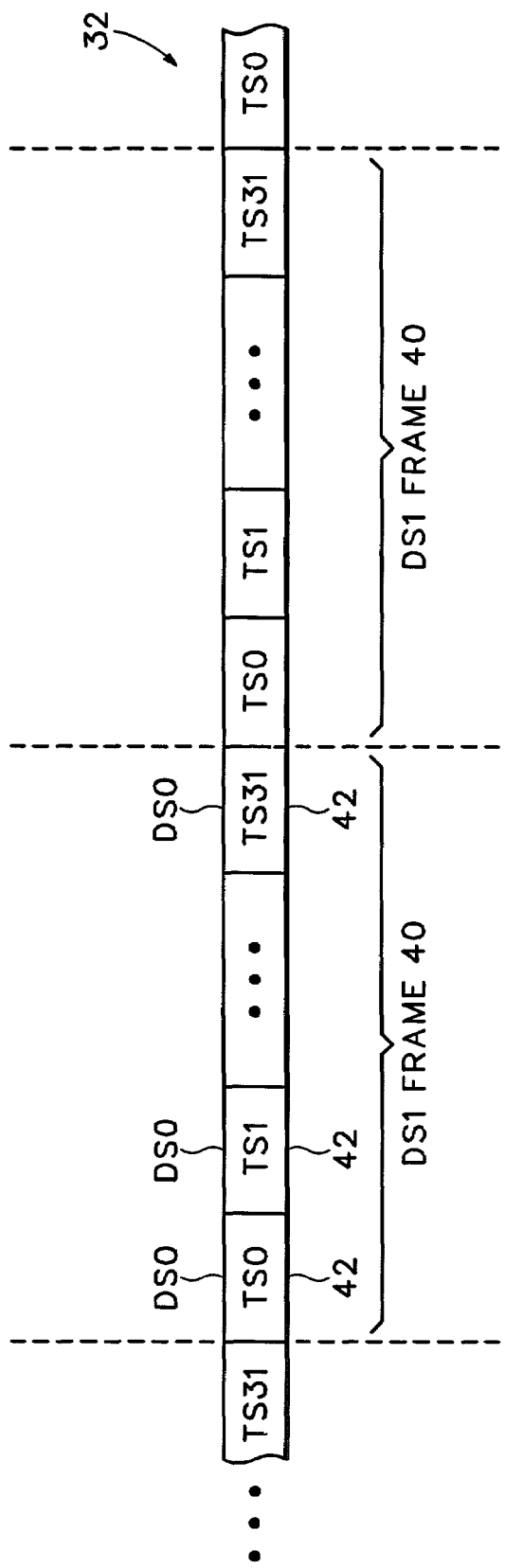
FIG. 2 is a block diagram showing a Time Division Multiplexed data stream.

FIG. 2 shows one example of a TDM data stream 32. Multiple DS1 frames 40 each contain multiple DS0 time slots 42. The frames 40 in one example occur at 125 microsecond intervals and include 24 or 32 time slots 42. In one example, each time slot 42 carries 8 bits. However, these numbers can vary.

Referring to FIGS. 1 and 2, when the register 28 in FIG. 1 has a value of one, then only one time slot 42 from each frame 40 should be written into or read from the FIFO 14. Similarly, if the value N from register 28 is twelve, then data from twelve time slots 42 in each frame 40 are used for writing data into or reading data from the FIFO 14.

The amount of data that needs buffering in the FIFOs 14 depends on the number of time slots 42 used in each frame 40. For example, if four eight-bit time slots are used in each frame 40 (FIG. 2) for outputting data, then the FIFO 14 should have enough bits stored in the FIFO 14 so thirty two bits can be burst out during the four time slots of the next frame 40. On the other hand, if too much data is stored in the FIFO 14, before it is read out from the TDM data stream 32, then there is an unnecessary latency that occurs between the received data and the transmitted data.

Accordingly, if the number of time slots N used in each TDM frame is increased, the controller 24 may increase the full threshold and half-full threshold 18. This allows more data from the increased number of time slots to be burst into or out of the FIFO 14. On the other hand, when a fewer number of time slots are used in each frame, the full threshold 16 and half-full threshold 18 may be lowered by the controller 24. Data reads out of the FIFO 14 are initially enabled only when the data level 34 in the FIFO 14 reaches the half-full threshold 18. By reducing the half-full threshold 18, the controller 24 reduces latency by reducing the number frames required to fill the FIFO 14 to the half-full threshold 18.

Figure 3:
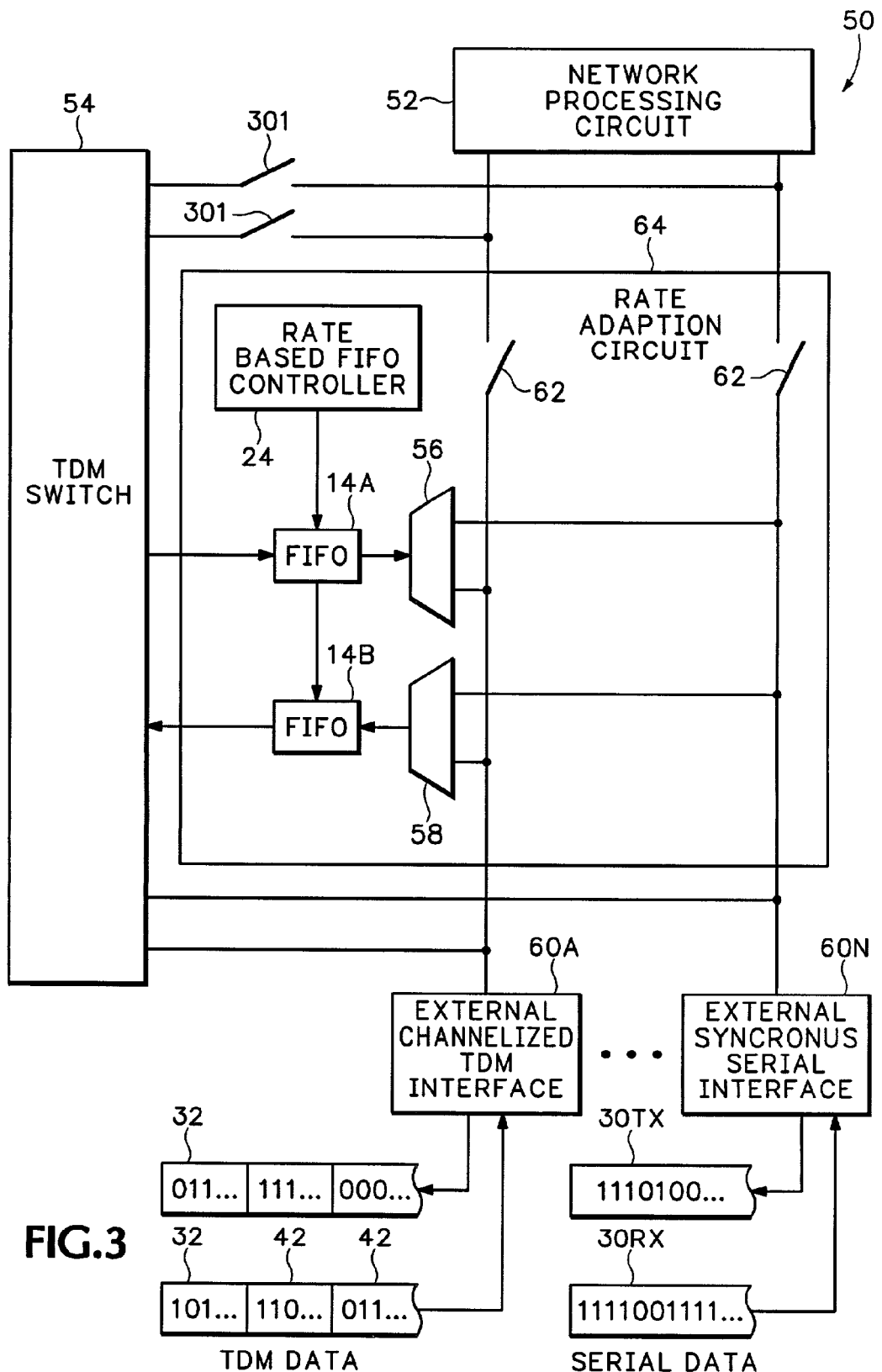
FIG. 3 is a block diagram of a network processor that uses the rate based FIFO controller shown in FIG. 1.

FIG. 3 shows an interface circuit 64 for a network processor 50 that uses the rate based FIFO controller 24. Multiple external interfaces 60A–60N receive or transmit either serial data 30 or TDM data 32. For example, an external interface 60A receives and transmits TDM data 32 and an external interface 60N receives and transmits serial data 30. The external interfaces 60A–60N are coupled to multiple multiplexers 56 and 58 and coupled through switches 62 to a network processing circuit 52. The network processing circuit 52 is any network routing or switching circuitry used to transfer packets between different endpoints.

The external interfaces 60A–60N are also coupled to TDM switch 54. There is at least one FIFO 14A for receiving TDM data from the TDM switch 54 and at least one FIFO 14B for receiving serial data from the external interfaces 60A–60N through the multiplexer 58. There can be multiple pairs of FIFOs 14A and 14B coupled to different rate based FIFO controllers 24 for providing rate adaptation for multiple different external interfaces 60A–60N. The network processing circuit 52, TDM switch 54, FIFOs 14A and 14B, and external interfaces 60A–60N are all known to those skilled in the art and are therefore not described in further detail. In one example, the TDM switch 54 is a model TTSI4K32T device made by Lucent Technologies and the FIFOs 14 are Asynchronous FIFO V3.0 cores from Xilinx, Inc. 2100 Logic Drive San Jose, Calif. 95124.

Incoming TDM data 32 is sent through the TDM switch 54 to the FIFO 14A. The rate based FIFO controller 24 enables bits from the TDM data 32 to be written into the FIFO 14A according to the FIFO threshold levels 16 and 18 previously described in FIG. 1. The controller 24 also enables reading out serial data 30tx from FIFO 14A according to the threshold levels 16 and 18 (FIG. 1). The serial data read from FIFO 14A is then output through multiplexer 56 to a selected one of the external interfaces, such as external interface 60N. The serial data 30tx is then transmitted from the external interface 60N to an external network (not shown).

In another example, serial data 30Rx is received at one of the external interfaces, such as external interface 60N. An example of a serial data 30 format is High Level Data Link Control (HDLC). An HDLC receiver can readily determine the beginning and end of packets embedded in an HDLC formatted serial bit stream. The incoming serial data 30Rx is sent through multiplexer 58 to FIFO 14B.

The bits from the serial data stream 30 are accumulated in the FIFO 14B according to the threshold levels established for the TDM data stream 32 that is going to receive the data read out from FIFO 14B. The threshold levels for FIFOs 14A and 14B can be different depending on the number of time slots 42 used by the two TDM data streams associated with FIFOs 14A and 14B.

The controller determines when a number of bits in the FIFO 14B have reached the threshold level established for FIFO 14B. A read enable signal is then generated by the controller 24 enabling the bits in FIFO 14B to be burst out to the TDM switch 54. The TDM switch 54 enables the bits to be burst in the appropriate time slots 42 (FIG. 2) in the TDM frame and then outputs the bits to the appropriate external interface, such as external interface 60A.

In another example, the serial data 30 is terminated at the network processing circuit 52 via path 62. The network processing circuit 52 reads headers in the packets to determine how to route, switch or generally process the received data. There are other configurations in the network processor 50 where TDM data 32 is transferred via the TDM switch on path 301 to a similar serial data or TDM data stream on a different external interface 60A–60N.

The controller 24 allows the FIFOs 14A and 14B to efficiently buffer the bursty TDM data 32 with the constant rate serial data 30 for different time slot configurations. For example, two selected time slots 42 of the TDM data 32 may be designated for outputting onto a serial data stream 30. The TDM switch 54 for each TDM frame bursts 16 bits (assuming 8 bits per time slot 42) at a bit rate in one example of 2.048 Million Bits Per Second (mbps). The TDM switch 54 waits for the two selected time slots in each frame and bursts 8 bits of TDM data during each time slot at the 2.048 mbps rate.

Figure 4:
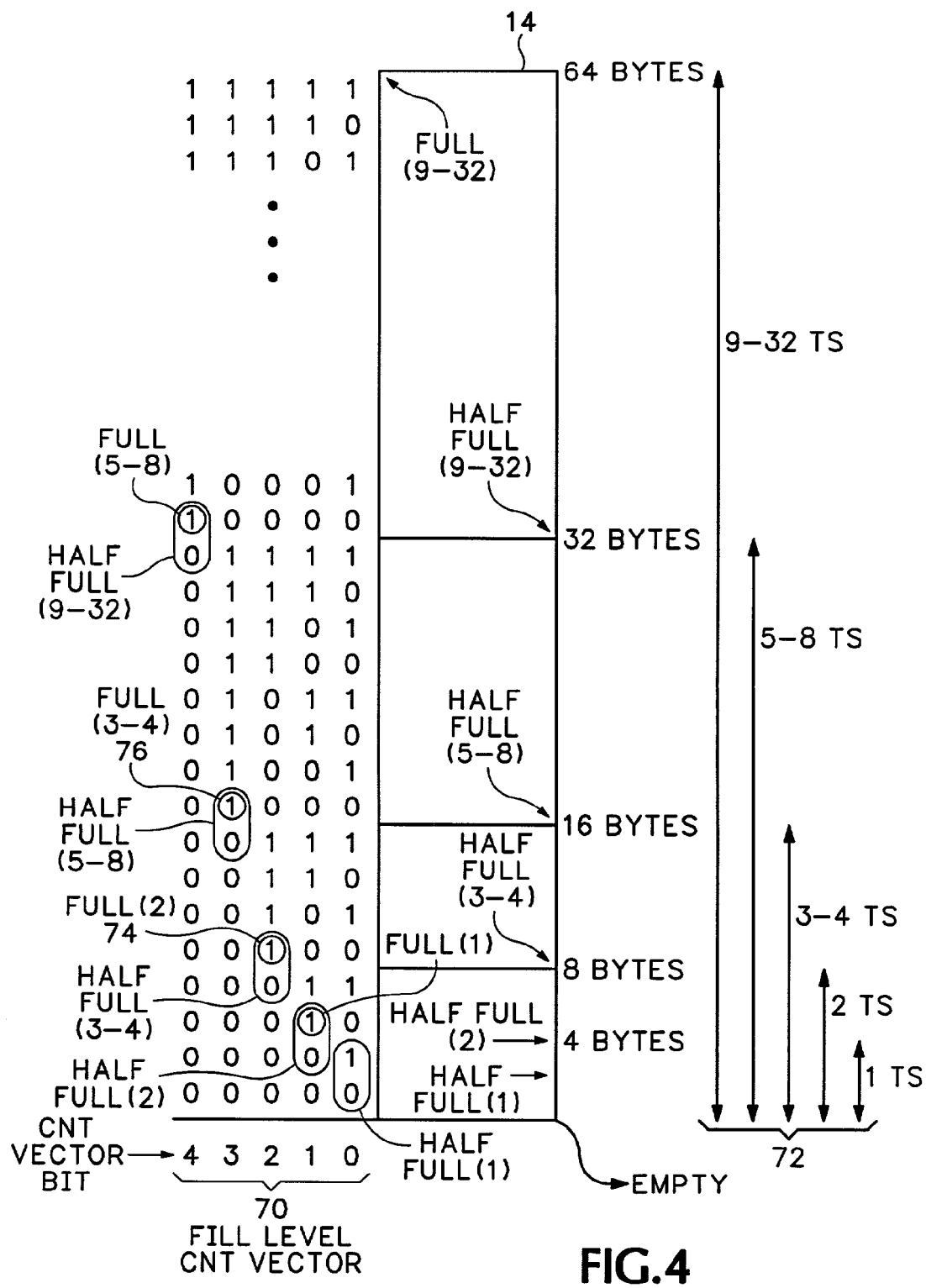
FIG. 4 is a diagram showing how rate based fill thresholds are used by the rate based FIFO controller.

FIG. 4 is a diagram showing in further detail how the rate based FIFO controller 24 selects the thresholds for the FIFO 14 according to the number of time slots used in the TDM data stream. A fill level count value vector 70 indicates how much data is currently stored in the FIFO 14. In the example shown in FIG. 4, only the five most significant bits of the count value 70 are represented in the vector. The count value 70 is zero when there are less than two bytes (16 bits) of data in the FIFO 14. The count value 70 is equal to one when there are at least two bytes but fewer than four bytes of data in the FIFO 14, and so forth. Each incremental count in the five-bit vector 70 represents an incremental FIFO fill level of two bytes.

Ranges 72 identify the full and half_full fill thresholds for different ranges of the number (N) of selected time slots (TS) 42 per frame. For example, for (N) equal to one time slot (TS) per frame 40, the full and half_full fill thresholds are set at four bytes and two bytes respectively. For (N) equal to two time slots (TS) per frame 40, the full and half_full fill thresholds are set at eight bytes and four bytes respectively. For the range of 3–4 time slots (TS) per frame, the full and half_full fill thresholds are set at sixteen bytes and eight bytes respectively. For the range of 5–8 time slots (TS) per frame 40, the full and half_full fill thresholds are set at thirty-two bytes and sixteen bytes respectively. For the range of 9–32 time slots (TS) per frame 40, the full and half_full fill thresholds are set at sixty-four bytes and thirty-two bytes respectively. Thus, in the implementation shown in FIG. 4, the half_full and full fill thresholds are doubled for each increasing time slot range 72.

Using these fill level count vector thresholds simplifies the logic used for identifying when a threshold has been crossed. For example, the third bit 74 (count vector bit2) incrementing from a "0" to a "1" with higher order count vector bit4 and bit3 both equal to zero, indicates that the data in FIFO 14 has just reached the half_full threshold for the N=3–4 time slot range 72. It also indicates that the data in FIFO 14 has just reached the full threshold for the N=2 time slot range 72. The fourth bit 76 (count vector 70 bit3) switching from a "0" to a "1", with the higher order count vector 70 (bit4) equal to zero, indicates the data in the FIFO 14 has just reached the half_full threshold for the N=5–8 time slot range 72. It also indicates that the data in FIFO 14 has just reached the full threshold for the N=3–4 time slot range 72. The fifth bit 76 (count vector 70 bit4) switching from a "0" to a "1", indicates the data in the FIFO 14 has just reached the half_full threshold for the N=9–32 time slot range 72. It also indicates that the data in FIFO 14 has just reached the full threshold for the N=5–8 time slot range 72. For the N=9–32 time slot range 72, an absolute FIFO full flag indicates FIFO 14 has reached a full threshold. For all timeslot ranges 72, an empty flag signal is used to identify the FIFO empty condition.

Figure 5A:
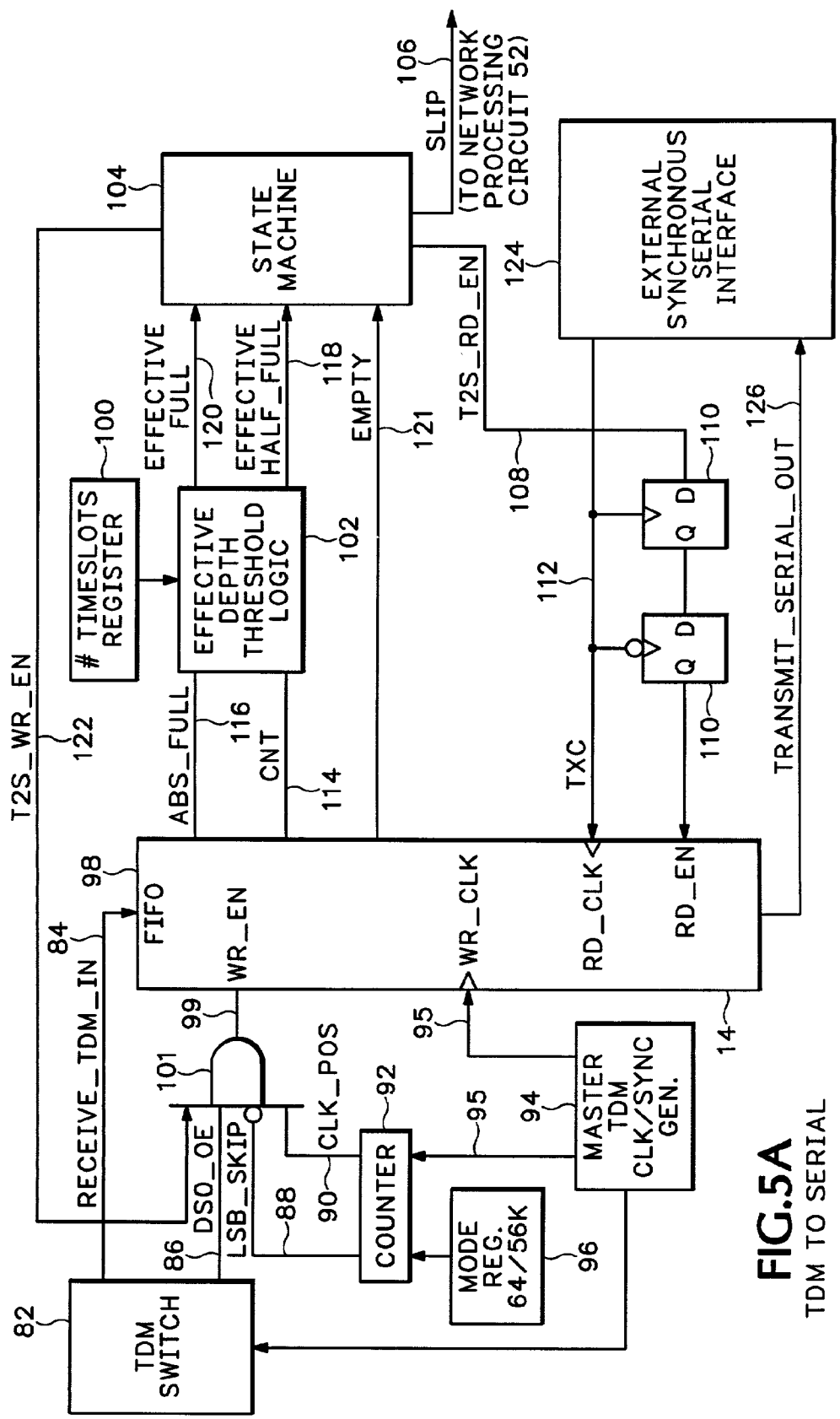
FIG. 5A is a detailed block diagram showing how the rate based FIFO controller is used for TDM to serial rate adaptation.

FIG. 5A shows in further detail how the rate based FIFO controller 24 performs TDM to serial data rate adaptation. A received TDM data stream 84 is output from a TDM switch 82 to a FIFO 98. The TDM data 84 written into FIFO 98 is controlled according to a write enable signal 99 and a write clock signal 95. The write enable signal 99 is qualified by signals through a gate 101.

Effective depth logic 102 receives a count value 114 and an absolute full signal 116 from the FIFO 98. The count value 114 indicates how much data is in FIFO 98. The absolute full signal 116 is activated when the entire FIFO 98 is full of data. The effective depth threshold logic 102 generates an effective half_full signal 118 and an effective full signal 120 according to the signals 114 and 116 and a static time slot number output by register 100.

The effective half_full signal 118 is activated when the data in the FIFO 98 reaches or exceeds the half_full threshold according to the number of time slots N as previously described in FIG. 4. The effective full signal 120 is activated when the data in the FIFO 98 reaches or exceeds the full threshold value associated with the number of time slots N as previously described in FIG. 4.

A state machine 104 receives the effective half_full signal 118 and the effective full signal 120 and an empty signal 121. The empty signal 121 is activated when there is no data in the FIFO 98. The state machine 104 activates a TDM to Serial (T2S) write enable signal 122 and a TDM to Serial (T2S) read enable signal 108 according to the effective half_full signal 118, effective full signal 120, and empty signal 121. The state machine write enable signal 122 is fed into gate 101 for controlling the FIFO write enable signal 99. The gate 101 also receives DS0 output enable signal 86 output from the TDM switch 54. The output enable signal 86 ensures valid DS0 time slot data is transferred from the TDM switch 82.

In one example, the FIFO 98 is clocked at a rate of 32.768 Megahertz (MHz) by a TDM clock 94. However, the TDM data 84 is transferred into the FIFO 14 at a 2.048 MHz rate. Each bit transmitted from the TDM data stream 84 is sampled for one clock period of the 32 MHz Master TDM clock 95 according to the gated write enable signal 99. A counter 92 receives the Master TDM clock 95 and outputs a clock position signal 90 to the gate 101. The clock position signal 90 is activated for one clock cycle per bursted bit of the TDM data 84. In one example, the clock position signal 90 is activated at the 75% bit position for each bursted bit of TDM data 84.

A least significant bit skip signal (LSB_SKIP) 88 is output from counter 92 to the gate 101. The skip signal 88 is used to deactivate the write enable signal 99 for the least significant bit of each time slot when N×56k mode is configured in a mode register 96. The N×56k mode is used when connecting to TDM services that do not guarantee end-to-end preservation of the LSB in each time slot. When an N×64k mode is configured in mode register 96, the LSB skip signal 88 enables every bit, including the least significant bit, for each time slot written into the FIFO 98.

A serial data transmit clock (TXC) 112 from the external interface 124 is used for controlling the FIFO read clock used for reading out serial data 126. The T2S read enable signal 108 output from the state machine 104 is used for controlling the FIFO read enable. The read enable signal 108 is synchronized with the transmit clock 112 using flip-flops 110.

A slip signal 106 is output from the state machine 104 to the network processing circuit 52 previously shown in FIG. 3. The slip signal 106 is used as an interrupt for notifying the network processing circuit 52 when the FIFO 98 has moved into either an effective full or empty state.

Figure 5B:
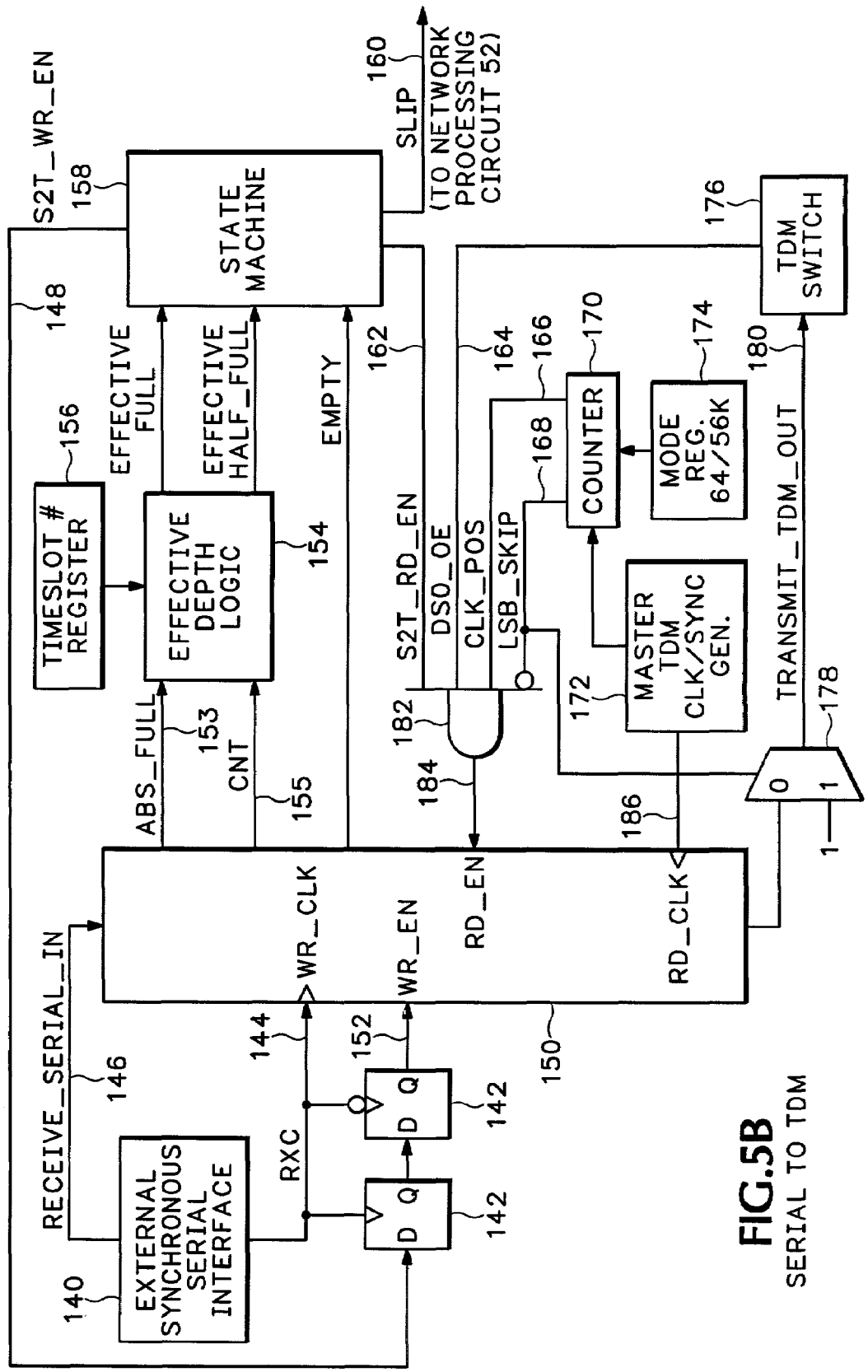
FIG. 5B is a detailed block diagram showing how the rate based FIFO controller is used for serial to TDM rate adaptation.

FIG. 5B shows how the controller 24 is used for writing serial data 146 into a FIFO 150 and bursting TDM data 180 out of the FIFO 150. The write clock of the FIFO 150 is used for writing the serial data 146 into FIFO 150 and is controlled by a receive clock (RXC) 144 from external interface 140. A FIFO write enable signal 152 is controlled by a Serial to TDM (S2T) write enable signal 148 generated by a state machine 158. The write enable signal 148 is synchronized with the receive clock 144 using flip-flops 142.

Effective depth logic 154 receives the count and absolute full signals from the FIFO 150 and the static time slot number N from a time slot number register 156. The effective depth logic 154 generates the effective half_full and effective full signals for the configured time slot number N as previously described. The state machine 158 generates the Serial to TDM (S2T) write enable signal 148 and the S2T read enable signal 162 according to the effective half_full and effective full signals output from the effective depth logic 154 and to the empty signal output directly from the FIFO 150. The state machine 158 also generates a slip signal 160 for notifying the network processing circuit 52 whenever the FIFO 150 is empty or effectively full.

A FIFO read enable signal 184 and a read clock signal 186 are used for reading TDM data 180 out from the FIFO 150. The read enable signal 184 is qualified by a multiplicity of signals fed into gate 182. The gate 182 receives the state machine read enable 162 that activates the FIFO read enable signal 184 according to the data level in the FIFO 150. The transmit output enable signal 164 is output by the TDM switch 176 for the appropriate time slots in the TDM data stream 180. A clock position signal 166 is activated for a selected period of the TDM clock 186. In one example, the clock position signal 166 is activated at about 12.5% bit position of each TDM bit on TDM output data 180 destined to be sampled by the TDM switch 176.

A LSB skip signal 168 is used for skipping the least significant bit of each time slot when the system is operating in the N×56K mode. The LSB skip signal 168 is also used to control a multiplexer 178 that generates a "1" for the least significant bit of each time slot when the system is operating in the N×56K mode. Doing so guarantees a minimum "ones density" of at least one "1" bit for any eight consecutive data bits.

Figures 6, 7:
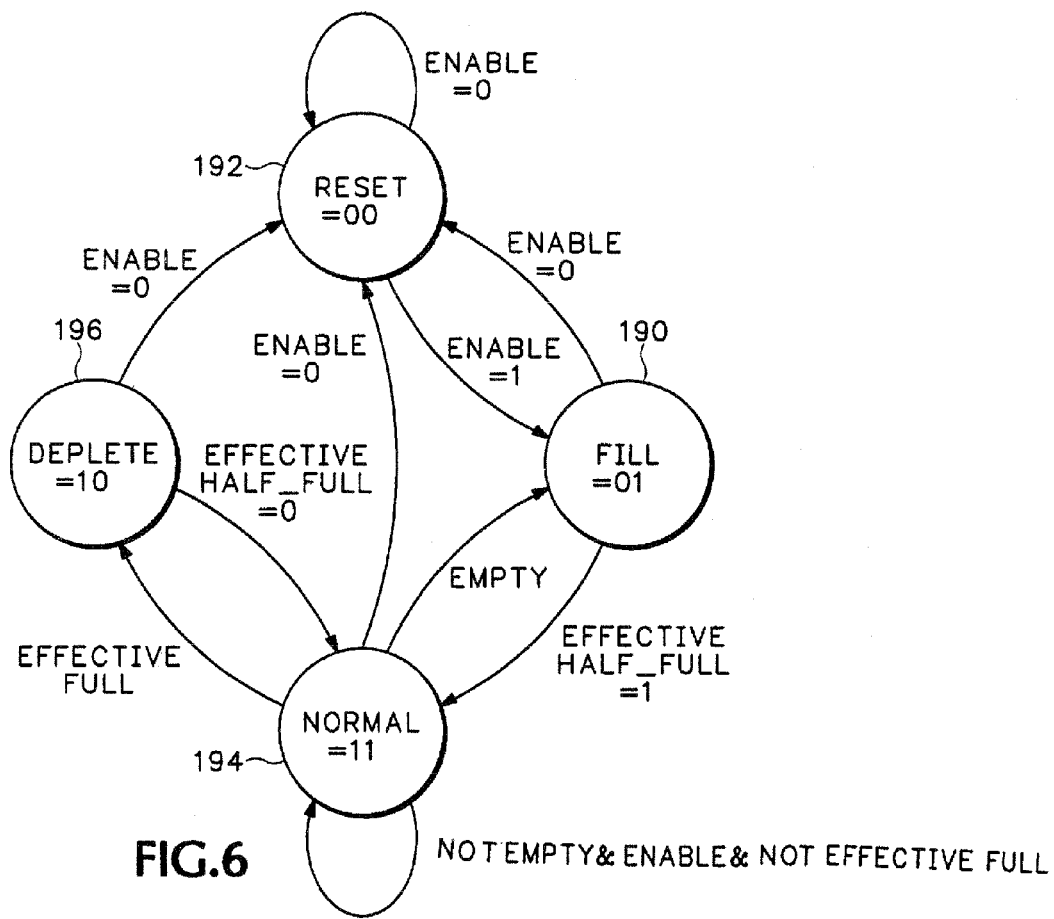
FIG. 6 is a state diagram showing how a state machine in FIGS. 5A and 5B operates.
FIG. 7 is a logic table showing how the state machine in FIGS. 5A and 5B controls data transfers in a FIFO.

FIG. 6 is a diagram showing how the state machine 104 in FIG. 5A or the state machine 158 in FIG. 5B operates. FIG. 7 includes a logic table showing the different outputs generated by the state machines. The state machine goes into a reset state 192 whenever an enable signal is deactivated. In the reset state 192, the state machine generates the output "00". The first bit "x0" is used to control the write enable line in the FIFO and the second bit "0x" is used to control the read enable signal in the FIFO. When both bits are "00", then both the read enable and the write enable are disabled and the FIFO cannot read or write data.

When the enable signal is activated, the state machine goes into a fill state 190. In the fill state, the write enable bit "x1" is activated, allowing data to be written into the FIFO. The read enable bit "0x" is deactivated in the fill state 190, preventing data from being read out from the FIFO. The state machine 80 remains in the fill state 190 until the enable signal is deactivated or until the half-full threshold has been reached.

The half-full and full thresholds are determined by monitoring the count bits 70 as previously shown in FIG. 4, corresponding to vector 114 in FIG. 5A and vector 155 in FIG. 5B. For certain time slot ranges, the absolute full signal output directly by the FIFO (116 in FIGS. 5A and 153 in FIG. 5B) can be used for determining the full threshold. See signal 116 in FIG. 5A. For example, as shown in FIG. 4, the FIFO 14 may have a total size of 64 bytes. The full threshold for time slot range 17–32 is selected at 64 bytes. Therefore, when the value N is configured between 17–32, the absolute full signal generated by the FIFO can be used for identifying a full condition. The empty threshold can be determined by a signal output directly from the FIFO when there are no more remaining bytes regardless of the time slot range.

Referring back to FIG. 6, when the effective half_full condition is detected, the state machine moves from the fill state 190 to the normal state 194. In the normal state, both the read enable bit "1x" and the write enable bit "x1" are enabled. This enables the FIFO to both write data into the FIFO and read data out of the FIFO at the same time. The state machine stays in the normal state 194 as long as the enable signal is active and the FIFO does not reach an effective full or empty condition. If the empty threshold occurs, then the state machine goes back to the fill state 190.

If the effective full condition occurs, then the state machine moves into the deplete state 196. In the deplete state, the read enable bit "1x" is activated and the write enable bit "x0" is deactivated. This allows data to be read out of the FIFO but not be written into the FIFO. The state machine moves from the deplete state to the reset state 192 if the enable signal is deactivated. The state machine moves from the deplete state back to the normal state 194 when the data level in the FIFO falls below the half_full threshold.

Whenever the state machine is in the fill state 190 or the deplete state 196, a slip signal is generated (FIG. 7). The slip signal is used to generate an interrupt to the network processing circuit 52 in FIG. 3.

Figure 8:
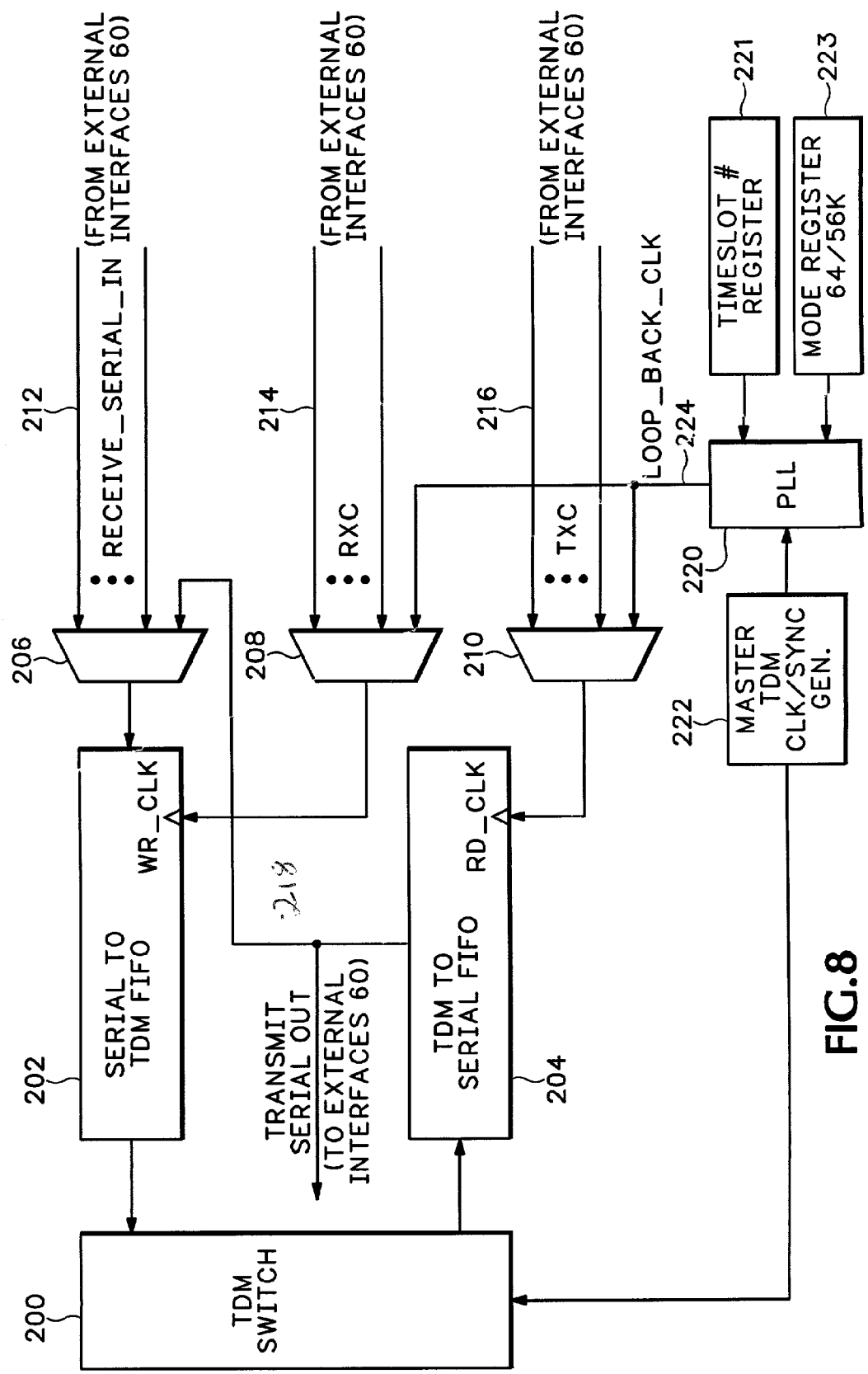
FIG. 8 is a diagram of a loop back circuit used in the network processor shown in FIG. 3.

FIG. 8 shows a loop back circuit that is used for diagnostic testing. A first multiplexer 206 receives any one of multiple serial bit streams 212 for feeding into a serial to TDM FIFO 202. A second multiplexer 208 receives any one of multiple serial receive clocks 214 from the external interfaces 60 used for operating the write clock in the serial to TDM FIFO 202. A multiplexer 210 is used for receiving any one of multiple transmit clocks 216 from the external interfaces 60 for driving the read clock for a TDM to serial FIFO 204.

In order to test the FIFOs 202 and 204, a loop back clock 224 is generated from the TDM clock 222. Loop back clock 224 is synthesized via a Phase Locked Loop (PLL) 220 that is phase locked to the Master TDM clock 222. The synthesized frequency for loop back clock 224 is determined by the value N in the time slot register 221 and the 64/56K mode register 223. In a test mode, the loop back clock 224 is used as both the write clock for FIFO 202 and the read clock for FIFO 204. The serial output 218 from FIFO 204 is directed through multiplexer 206 as the serial input for the FIFO 202. Thus, TDM data output from TDM switch 200 to FIFO 204 can thus be looped back to TDM switch 200 via serial FIFO 202 for diagnostic purposes.

The rate based FIFO controller provides scaleable FIFO TDM switch-to-serial port depths according to N. This provides lower data transfer latency for cross-connected data between a TDM switch and synchronous serial ports receiving N×56/64 kbps clocking. Latency reduction is especially evident for lower values of N. The controller allows the flexible assignment of limited FIFOs and serial clock synthesis resources to selected synchronous serial interfaces. The controller also provides data slip interrupts when either FIFO is in a slip state.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. All modifications and variations coming within the spirit and scope are claimed in the following claims.

The invention claimed is:

1. A system for controlling a FIFO, comprising:
   a controller receiving a channel value indicating a number of channels used in a TDM data stream for transferring data, the controller varying data fill level threshold levels in the FIFO used for enabling read or write operations according to the number of channels value; and
   depth logic that varies a half_full FIFO threshold and a full FIFO threshold according to the number of channels used in the TDM data stream.

2. A system for controlling a FIFO, comprising:
   a controller receiving a channel value indicating a number of channels used in a TDM data stream for transferring data, the controller varying data fill level threshold levels in the FIFO used for enabling read or write operations according to the number of channels value, wherein a depth logic identifies ranges for the number of channels used in the TDM data stream and doubles a half_full threshold and a full threshold for each higher range.

3. A system for controlling a FIFO, comprising:
a controller receiving a channel value indicating a number of channels used in a TDM data stream for transferring data, the controller varying data fill level threshold levels in the FIFO used for enabling read or write operations according to the number of channels value, wherein the controller comprises a state machine operating between different FIFO read or write states depending upon when data in the FIFO reaches the data threshold levels.

4. A system according to claim 3 including a TDM switch output enable signal for controlling the read or write operations.

5. A system according to claim 3 including a least significant bit signal disabling the read or write operations for a least significant bit for each time slot in the TDM data stream.

6. A system according to claim 3 including
a clock position signal that enables the FIFO read or write operations for a single clock period of a TDM clock.

7. A system according to claim 3 including
a clock synchronization circuit for synchronizing a FIFO serial read or write enable with a serial interface clock.

8. A system according to claim 3 wherein the state machine operates in a normal state where both a FIFO read enable and a FIFO write enable are activated when the FIFO has not reached a full or empty threshold.

9. A system according to claim 8 wherein the state machine operates in a FILL state where the FIFO read enable is deactivated and the FIFO write enable is activated when the FIFO has reached the empty threshold.

10. A system according to claim 9 wherein the state machine operates in a DEPLETE state where the FIFO read enable is activated and the FIFO write enable is deactivated when the FIFO has reached the full threshold.

11. A system according to claim 10 wherein the state machine generates an interrupt signal whenever the FIFO is in the FILL or DEPLETE state.

12. A system according to claim 3 including
a TDM switch coupled to a first FIFO port and an external interface coupled a second FIFO port.

13. A system according to claim 3 wherein the controller is used in a network processing circuit.

14. A system according to claim 3 wherein the TDM data stream is a T1 or E1 data stream and the channels are DS0 time slots.

15. A system for controlling a FIFO, comprising:
a controller receiving a channel value indicating a number of channels used in a TDM data stream for transferring data, the controller varying data fill level threshold levels in the FIFO used for enabling read or write operations according to the number of channels value; and
a loop back circuit that enables data from a TDM to serial FIFO to feed data back into a Serial to TDM FIFO.

16. A system according to claim 15 wherein the loop back circuit includes a first multiplexer for receiving serial input streams, a second multiplexer for receiving serial receive clocks, and a third multiplexer for receiving serial transmit clocks.

17. A system for controlling a FIFO, comprising:
a controller receiving a channel value indicating a number of channels used in a TDM data stream for transferring data, the controller varying data fill level threshold levels in the FIFO used for enabling read or write operations according to the number of channels value; and
a count value indicating a data level for the FIFO, the controller using each increasingly significant bit in the count value to identify a half_full and full threshold for an increasing channel value range.

18. A method for controlling how data is transferred in and out of a buffer, comprising:
identifying a time slot value for a number of time slots used for receiving or transmitting data in a frame;
determining one or more data fill level threshold values in the buffer according to the time slot value;
controlling when data is written into and read out of the buffer according to a data level in the buffer in relation to the data fill level threshold values;
assigning different data threshold values for different time slot value ranges; and
doubling the data threshold values for each increasingly higher time slot value range.

19. A method according to claim 18 including controlling writing or reading in the buffer according to an output enable from a TDM switch.

20. A method for controlling how data is transferred in and out of a buffer, comprising:
identifying a time slot value for a number of time slots used for receiving or transmitting data in a frame;
determining one or more data fill level threshold values in the buffer according to the time slot value;
controlling when data is written into and read out of the buffer according to a data level in the buffer in relation to the data fill level threshold values;
assigning different data threshold values for different time slot value ranges; and
receiving a count value representing the data fill level in the buffer; and
assigning the data fill level threshold values so that one bit in the count value is used for identifying a half full threshold for each one of the time slot value ranges and one bit in the count value is used for identifying a full threshold for each one of the time slot value ranges.

21. A method for controlling how data is transferred in and out of a buffer, comprising:
identifying a time slot value for a number of time slots used for receiving or transmitting data in a frame;
determining one or more data fill level threshold values in the buffer according to the time slot value;
controlling when data is written into and read out of the buffer according to a data level in the buffer in relation to the data fill level threshold values; and
using a first buffer for writing in serial data and reading out channelized data and using a second buffer for writing in channelized data and reading out serial data.

22. A method according to claim 21 including assigning different data fill level threshold values for the first and second buffer according to the number of time slots used in each frame for the channelized data read out of the first buffer and written into the second buffer.

23. A method according to claim 21 including maintaining separate states for both the first and second buffer, the states including a FILL state when the data level reaches an empty threshold, a NORMAL state when the data level is between a full threshold and the empty threshold, and a DEPLETE state where the data level reaches the full threshold.

24. A method according to claim 23 including:
activating a buffer read enable signal and a buffer write enable signal in the NORMAL state;

deactivating the buffer read enable signal and activating the buffer write enable signal in the FILL state; and activating the buffer read enable signal and deactivating the buffer write enable signal in the DEPLETE state.

25. A method according to claim 21 including reading out serial data from the second buffer and writing the serial data back into the first buffer.

26. A method according to claim 25 including generating a serial clock for both writing the serial data into the first buffer and reading the serial data out from the second buffer.

27. A method according to claim 26 including phase locking a frequency of the serial clock to a TDM clock.

28. A method according to claim 27 including controlling the serial clock according to a number of channels (N) and a N×56K or N×64K mode register value.

29. A computer readable medium containing software executable by one or more processors for controlling how data is transferred in and out of a buffer, comprising:
 code for identifying a time slot value for a number of time slots used for receiving or transmitting data in a frame;
 code for determining one or more data fill level threshold values in the buffer according to the time slot value;
 code for controlling when data is written into and read out of the buffer according to a data level in the buffer in relation to the data fill level threshold values;
 code for assigning different data threshold values for different time slot value ranges; and
 code for doubling the data threshold values for each increasingly higher time slot value range.

30. A computer readable medium according to claim 29 including code for controlling writing or reading in the buffer according to an output enable from a TDM switch.

31. A computer readable medium containing software executable by one or more processors for controlling how data is transferred in and out of a buffer, comprising:
 code for identifying a time slot value for a number of time slots used for receiving or transmitting data in a frame;
 code for determining one or more data fill level threshold values in the buffer according to the time slot value;
 code for controlling when data is written into and read out of the buffer according to a data level in the buffer in relation to the data fill level threshold values;
 code for assigning different data threshold values for different time slot value ranges; and
 code for receiving a count value representing the data fill level in the buffer; and
 code for assigning the data fill level threshold values so that one bit in the count value is used for identifying a half full threshold for each one of the time slot value ranges and one bit in the count value is used for identifying a full threshold for each one of the time slot value ranges.

32. A computer readable medium containing software executable by one or more processors for controlling how data is transferred in and out of a buffer, comprising:
 code for identifying a time slot value for a number of time slots used for receiving or transmitting data in a frame;
 code for determining one or more data fill level threshold values in the buffer according to the time slot value;
 code for controlling when data is written into and read out of the buffer according to a data level in the buffer in relation to the data fill level threshold values; and
 code for using a first buffer for writing in serial data and reading out channelized data and using a second buffer for writing in channelized data and reading out serial data.

33. A computer readable medium according to claim 32 including code for assigning different data fill level threshold values for the first and second buffer according to the number of time slots used in each frame for the channelized data read out of the first buffer and written into the second buffer.

34. A computer readable medium according to claim 32 including code for maintaining separate states for both the first and second buffer, the states including a FILL state when the data level reaches an empty threshold, a NORMAL state when the data level is between a full threshold and the empty threshold, and a DEPLETE state where the data level reaches the full threshold.

35. A computer readable medium according to claim 34 including:
 code for activating a buffer read enable signal and a buffer write enable signal in the NORMAL state;
 code for deactivating the buffer read enable signal and activating the buffer write enable signal in the FILL state; and
 code for activating the buffer read enable signal and deactivating the buffer write enable signal in the DEPLETE state.

36. A computer readable medium according to claim 32 including code for reading out serial data from the second buffer and writing the serial data back into the first buffer.

37. A computer readable medium according to claim 36 including code for generating a serial clock for both writing the serial data into the first buffer and reading the serial data out from the second buffer.

38. A computer readable medium according to claim 37 including code for phase locking a frequency of the serial clock to a TDM clock.

39. A computer readable medium according to claim 38 including code for controlling the serial clock according to a number of channels (N) and a N×56K or N×64K mode register value.

40. A system for controlling how data is transferred in and out of a buffer, comprising:
 means for identifying a time slot value for a number of time slots used for receiving or transmitting data in a frame;
 means for determining one or more data fill level threshold values in the buffer according to the time slot value;
 means for controlling when data is written into and read out of the buffer according to a data level in the buffer in relation to the data fill level threshold values;
 means for assigning different data threshold values for different time slot value ranges; and
 means for doubling the data threshold values for each increasingly higher time slot value range.

41. A system according to claim 40 including means for controlling writing or reading in the buffer according to an output enable from a TDM switch.

42. A system for controlling how data is transferred in and out of a buffer, comprising:
 means for identifying a time slot value for a number of time slots used for receiving or transmitting data in a frame;
 means for determining one or more data fill level threshold values in the buffer according to the time slot value;
 means for controlling when data is written into and read out of the buffer according to a data level in the buffer in relation to the data fill level threshold values;
 means for assigning different data threshold values for different time slot value ranges; and means for receiving a count value representing the data fill level in the buffer; and means for assigning the data fill level threshold values so that one bit in the count value is used for identifying a half full threshold for each one of the time slot value ranges and one bit in the count value is used for identifying a full threshold for each one of the time slot value ranges.

43. A system for controlling how data is transferred in and out of a buffer, comprising:

means for identifying a time slot value for a number of time slots used for receiving or transmitting data in a frame;

means for determining one or more data fill level threshold values in the buffer according to the time slot value;

means for controlling when data is written into and read out of the buffer according to a data level in the buffer in relation to the data fill level threshold values; and means for using a first buffer for writing in serial data and reading out channelized data and using a second buffer for writing in channelized data and reading out serial data.

44. A system according to claim 43 including means for assigning different data fill level threshold values for the first and second buffer according to the number of time slots used in each frame for the channelized data read out of the first buffer and written into the second buffer.

45. A system according to claim 43 including means for maintaining separate states for both the first and second buffer, the states including a FILL state when the data level reaches an empty threshold, a NORMAL state when the data level is between a full threshold and the empty threshold, and a DEPLETE state where the data level reaches the full threshold.

46. A system according to claim 45 including:

means for activating a buffer read enable signal and a buffer write enable signal in the NORMAL state;

means for deactivating the buffer read enable signal and activating the buffer write enable signal in the FILL state; and means for activating the buffer read enable signal and deactivating the buffer write enable signal in the DEPLETE state.

47. A system according to claim 43 including means for reading out serial data from the second buffer and writing the serial data back into the first buffer.

48. A system according to claim 47 including means for generating a serial clock for both writing the serial data into the first buffer and reading the serial data out from the second buffer.

49. A system according to claim 48 including means for phase locking a frequency of the serial clock to a TDM clock.

50. A system according to claim 49 including means for controlling the serial clock according to a number of channels (N) and an N×56K or N×64K mode register value.

* * * * *